(12) United States Patent
Jones et al.

(10) Patent No.: US 7,475,664 B2
(45) Date of Patent: *Jan. 13, 2009

(54) ADHESIVELY BONDED ENGINE INTAKE MANIFOLD ASSEMBLY

(75) Inventors: Bart R. Jones, Midland, MI (US); David M. Courter, Clarkston, MI (US); Kenneth J. Ritzema, Clarkston, MI (US); Mark A. McMaken, Richmond, MI (US); Selamawit Asfaw, Troy, MI (US)

(73) Assignee: Dow Global Technologies Inc, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/695,332

(22) Filed: Apr. 2, 2007

(65) Prior Publication Data

US 2007/0251483 A1   Nov. 1, 2007

Related U.S. Application Data

(63) Continuation of application No. 10/796,404, filed on Mar. 9, 2004, now Pat. No. 7,213,560, which is a continuation of application No. 10/318,926, filed on Dec. 13, 2002, now Pat. No. 6,739,302, which is a continuation of application No. 09/826,477, filed on Apr. 4, 2001, now Pat. No. 6,543,404.

(51) Int. Cl.
*F02M 35/10* (2006.01)
(52) U.S. Cl. .......................... 123/184.21; 123/184.61
(58) Field of Classification Search ...............................
123/184.21–184.61
See application file for complete search history.

(56) References Cited

U.S. PATENT DOCUMENTS

| 3,724,599 | A | 4/1973 | Heidacker |
| 3,903,350 | A | 9/1975 | Baird |
| 3,926,904 | A | 12/1975 | Scola |
| 3,993,126 | A | 11/1976 | Taylor |
| 4,101,003 | A | 7/1978 | Timour et al. |
| 4,266,604 | A | 5/1981 | Sumikawa et al. |
| 4,301,775 | A | 11/1981 | Smart et al. |
| 4,345,552 | A | 8/1982 | Kasting et al. |
| 4,374,717 | A | 2/1983 | Drauglis et al. |
| 4,402,518 | A | 9/1983 | Locacius |

(Continued)

FOREIGN PATENT DOCUMENTS

CA        2355052       7/2000

(Continued)

OTHER PUBLICATIONS

Copending U.S. Appl. No. 09/766,792, filed Jan. 22, 2001.

(Continued)

*Primary Examiner*—M. McMahon
(74) *Attorney, Agent, or Firm*—Dobrusin & Thennisch

(57) ABSTRACT

An engine intake manifold assembly (10), including a first component (12) having a first mating surface (14) and a second molded plastic component (16) having a second mating surface (18). The second molded plastic component (16) is adhesively bonded to the first component (12) with an adhesive (20). The adhesive bond strength exceeds the strength of the second molded plastic component (16).

11 Claims, 2 Drawing Sheets

U.S. PATENT DOCUMENTS

| | | |
|---|---|---|
| 4,471,731 A | 9/1984 | Kasting et al. |
| 4,480,609 A | 11/1984 | Hayashi |
| 4,492,267 A | 1/1985 | Cadars |
| 4,495,020 A | 1/1985 | Nakabayashi et al. |
| 4,498,433 A | 2/1985 | Ogawa |
| 4,522,165 A | 6/1985 | Ogawa |
| 4,531,578 A | 7/1985 | Stay et al. |
| 4,540,044 A | 9/1985 | Lenz |
| 4,544,432 A | 10/1985 | Foister et al. |
| 4,546,822 A | 10/1985 | Tamura |
| 4,576,223 A | 3/1986 | Humpolik et al. |
| 4,586,566 A | 5/1986 | Kern et al. |
| 4,600,051 A | 7/1986 | Wehrman |
| 4,608,950 A | 9/1986 | Payne et al. |
| 4,677,947 A | 7/1987 | Bousquet |
| 4,678,026 A | 7/1987 | Lenz et al. |
| 4,682,672 A | 7/1987 | Berger et al. |
| 4,708,105 A | 11/1987 | Leydorf et al. |
| 4,709,670 A | 12/1987 | Ampferer |
| 4,709,689 A | 12/1987 | Simcox |
| 4,709,757 A | 12/1987 | Bly |
| 4,735,261 A | 4/1988 | Huebner |
| 4,741,352 A | 5/1988 | Gray |
| 4,898,261 A | 2/1990 | Winberg et al. |
| 4,930,469 A | 6/1990 | Kamprath et al. |
| 4,938,314 A | 7/1990 | Sitzier et al. |
| 4,939,923 A | 7/1990 | Sharp |
| 4,940,086 A | 7/1990 | Stay |
| 4,941,936 A | 7/1990 | Wilkinson et al. |
| 4,951,783 A | 8/1990 | Kamprath et al. |
| 4,961,967 A | 10/1990 | Pluddemann |
| 4,985,523 A | 1/1991 | Mochizuki et al. |
| 5,058,542 A | 10/1991 | Grayson et al. |
| 5,083,537 A | 1/1992 | Onofrio et al. |
| 5,098,743 A | 3/1992 | Juday |
| 5,107,924 A | 4/1992 | Herbert et al. |
| 5,158,045 A | 10/1992 | Arthur et al. |
| 5,188,078 A | 2/1993 | Tamaki |
| 5,195,581 A | 3/1993 | Puntambekar et al. |
| 5,223,684 A | 6/1993 | Li et al. |
| 5,250,629 A | 10/1993 | Tani et al. |
| 5,265,566 A | 11/1993 | Arnold et al. |
| 5,284,203 A | 2/1994 | Dauvergne |
| 5,285,754 A | 2/1994 | Bell |
| 5,298,587 A | 3/1994 | Hu et al. |
| 5,320,875 A | 6/1994 | Hu et al. |
| 5,323,740 A | 6/1994 | Daily et al. |
| 5,323,745 A | 6/1994 | Sato et al. |
| 5,329,903 A | 7/1994 | Mueller et al. |
| 5,364,914 A | 11/1994 | Choate et al. |
| 5,365,901 A | 11/1994 | Kiczek |
| 5,375,569 A | 12/1994 | Santella |
| 5,376,428 A | 12/1994 | Palazzotto et al. |
| 5,412,024 A | 5/1995 | Okada et al. |
| 5,424,371 A * | 6/1995 | Frihart et al. ............ 525/420.5 |
| 5,433,786 A | 7/1995 | Hu et al. |
| 5,476,237 A | 12/1995 | Clarke |
| 5,492,086 A | 2/1996 | Kuhns |
| 5,494,712 A | 2/1996 | Hu et al. |
| 5,511,518 A | 4/1996 | Jain et al. |
| 5,531,196 A | 7/1996 | Clark |
| 5,548,026 A | 8/1996 | Jorissen et al. |
| 5,569,734 A | 10/1996 | Petschel et al. |
| 5,575,256 A | 11/1996 | Peters et al. |
| 5,617,825 A | 4/1997 | Altmann et al. |
| 5,636,605 A | 6/1997 | Nomizo et al. |
| 5,636,607 A | 6/1997 | Sattler et al. |
| 5,636,759 A | 6/1997 | Brummer |
| 5,642,697 A | 7/1997 | Jahrens et al. |
| 5,663,284 A | 9/1997 | Kominami et al. |
| 5,669,350 A | 9/1997 | Altmann et al. |
| 5,704,325 A | 1/1998 | Sattler et al. |
| 5,704,335 A | 1/1998 | Akutagawa et al. |
| 5,715,782 A | 2/1998 | Elder |
| 5,717,009 A | 2/1998 | Matsushita et al. |
| 5,743,011 A | 4/1998 | Dickerson et al. |
| 5,746,168 A | 5/1998 | Lochbrunner et al. |
| 5,746,177 A | 5/1998 | Criss et al. |
| 5,791,312 A | 8/1998 | Sattler et al. |
| 5,794,591 A | 8/1998 | Kalebjian et al. |
| 5,797,589 A | 8/1998 | Kalebjian et al. |
| 5,837,958 A | 11/1998 | Fornsel |
| 5,865,244 A | 2/1999 | Moser |
| 5,875,758 A | 3/1999 | Fujita |
| 5,877,236 A | 3/1999 | Roesch et al. |
| 5,878,715 A | 3/1999 | Hernandez et al. |
| 5,883,192 A | 3/1999 | Natori et al. |
| 5,947,073 A | 9/1999 | Chaffin et al. |
| 5,957,100 A | 9/1999 | Frohwerk et al. |
| 6,013,709 A | 1/2000 | Masuyama et al. |
| 6,021,753 A | 2/2000 | Chaffin et al. |
| 6,069,219 A | 5/2000 | McCormick et al. |
| 6,131,543 A | 10/2000 | Achenbach et al. |
| 6,167,855 B1 | 1/2001 | Mammarella et al. |
| 6,267,093 B1 | 7/2001 | Lohr |
| 6,302,074 B1 | 10/2001 | Bolsover et al. |
| 6,497,413 B1 | 12/2002 | Schmatz |
| 6,543,404 B2 | 4/2003 | Jones et al. |
| 2002/0144808 A1 * | 10/2002 | Jones .......................... 165/173 |
| 2003/0165305 A1 * | 9/2003 | Dallas et al. .................. 385/92 |
| 2004/0266925 A1 * | 12/2004 | Shiono ....................... 524/262 |

FOREIGN PATENT DOCUMENTS

| | | |
|---|---|---|
| DE | 3720483 A1 | 1/1988 |
| DE | 3809944 A1 | 10/1989 |
| DE | 3927955 A1 | 2/1991 |
| DE | 41 03 685 A | 8/1992 |
| DE | 19735 445 A | 1/1999 |
| DE | 199 02817 A | 7/2000 |
| EP | 0512678 | 11/1992 |
| EP | 0823455 A | 2/1998 |
| EP | 0872632 A | 10/1998 |
| EP | 0992674 A2 | 12/2000 |
| GB | 1045948 | 10/1966 |
| GB | 2 245 931 A | 1/1992 |
| JP | 362003155 A | 1/1987 |
| JP | 407027016 A | 1/1995 |
| JP | 8-132529 | 5/1996 |
| JP | 11207826 | 3/1999 |
| JP | 11-302480 | 11/1999 |
| JP | 2000210947 | 2/2000 |
| WO | WO 99 14273 A | 3/1999 |
| WO | WO 00/43644 | 7/2000 |
| WO | WO01/44311 A1 | 6/2001 |
| WO | PCT/US01/46503 | 12/2001 |

OTHER PUBLICATIONS

Copending U.S. Appl. No. 09/825,721, filed Apr. 4, 2001.
Copending U.S. Appl. No. 09/921,636, filed Aug. 3, 2001.
Copending U.S. Appl. No. 09/922,030, filed Aug. 3, 2001.
Copending U.S. Appl. No. 60/260,570, filed Jan. 18, 2001.
Derwent AN 1980-F449C, Nissan Motor Co., Ltd. Great Britain 2037887A and B.
Patent Abstracts of Japan, vol. 11, No. 388 (M-652), Dec. 18, 1987 and JP 62 157267A (Tsuchiya Mfg. Co., Ltd.), Jul. 13, 1987 abstract.
Patent Abstracts of Japan, vol. 11, No. 057 (M-564), Feb. 21, 1987 and JP 61 218754A (Toyoda Gosel Co. Ltd.), Sep. 29, 1986 abstract.

* cited by examiner

ADHESIVELY BONDED ENGINE INTAKE MANIFOLD ASSEMBLY

CLAIM OF PRIORITY

This application is a continuation of Ser. No. 10/796,404, filed on Mar. 9, 2004 now U.S. Pat. No. 7,213,560, which is a continuation of Ser. No. 10/318,926, filed on Dec. 13, 2002 now U.S. Pat. No. 6,739,302, which is a continuation of Ser. No. 09/826,477 filed on Apr. 4, 2001 now U.S. Pat. No. 6,543,404.

TECHNICAL FIELD

The present invention relates to adhesively bonded engine component assemblies and more particularly to adhesively bonded intake manifold assemblies. The invention also relates to an intake manifold assembly employing a cure-on-demand adhesive.

BACKGROUND OF THE INVENTION

Historically, fabrication techniques have involved the fabrication of separate metal components and joining the components using fasteners, with an intermediate disposed gasket. This tends to require many parts and therefore is labor intensive.

Plastic engine intake manifold assemblies (such as for automotive vehicle engines) have been fabricated by near net shape manufacturing processes, such as lost core processes. While these tend to result in desirable near net shape products, the shapes of which may be complex, they typically are expensive.

In another popular process, two or more plastic intake manifold components are made, each with a planar mating surface. The components are joined at each of their respective mating surfaces by vibration welding. This process also tends to be time, energy and labor intensive. Further, there is a potential that any warpage of respective components or other surface irregularities will result in undesirable gaps at the mating surface upon welding. Thus, it is imperative that opposing mating surfaces are planar, which constrains design flexibility.

Accordingly, there is a need to provide a method of manufacture and resulting assembly, pursuant to which multiple components of an engine intake manifold assembly are joined together with an adhesive bond. There is a further need for respective components to be attached to each other in the optional absence of fasteners, a gasket or both. There is still a further need for a high integrity joint be achieved opposing mating surfaces that are non-planar, thereby enabling intricate plastic component shapes (with or without additional integrated components) to be molded by conventional molding processes.

SUMMARY OF THE INVENTION

The present invention meets the above needs and others by providing an engine intake manifold assembly including a first component having a first mating surface, and a second component having a second mating surface. A layer of adhesive is provided between the first and second components in contact with the respective mating surfaces for joining the first and second components to define an engine intake manifold assembly.

DETAILED DESCRIPTION OF THE PREFERRED EMBODIMENT

Figure 1:
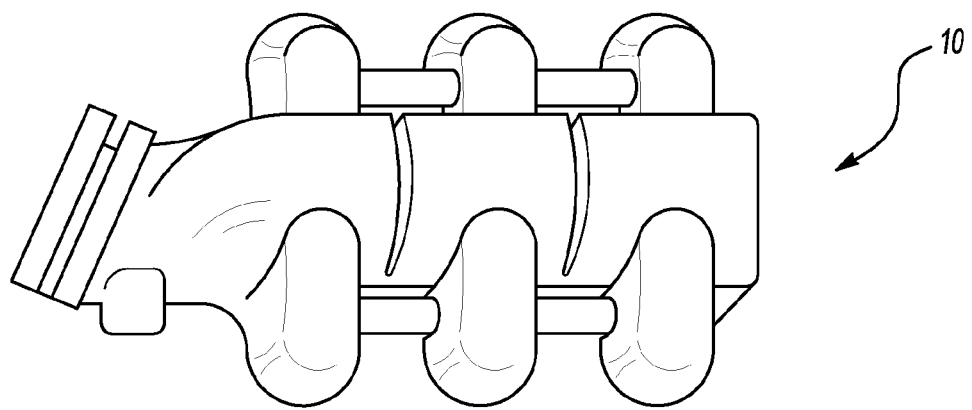
FIG. 1 is a perspective view of an intake manifold assembly in accordance with the present invention.
Figure 2:
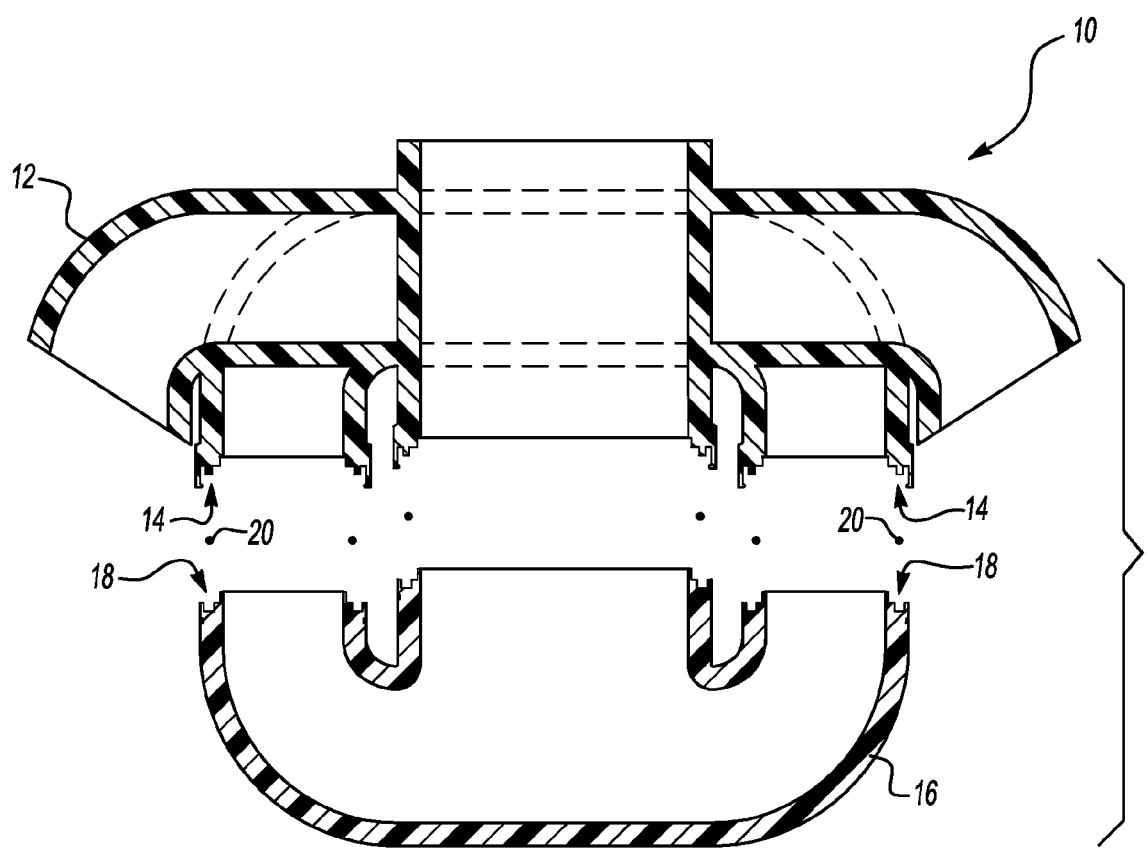
FIG. 2 is a sectional view of a joint formed in accordance with the present invention.

Referring to FIGS. 1, 2, 3a-3c there is shown an intake manifold assembly 10 of the present invention including a first component 12 having a first mating surface 14. A second component 16 having a second mating surface 18 is bonded to the first component with an intermediate layer of adhesive 20. Either or both of the first or second mating surfaces can include one or more additional coatings, layers or components. Thus, it is contemplated that the mating surfaces of either or both of the first or second components may not necessarily be integrally formed on the components.

Optionally, either or both of the first component 12 or second component 16 has a member for facilitating joinder or location of the components relative to each other or to the engine. Referring more specifically to FIGS. 2 and 3a-3c (where like parts are denoted by like reference numerals), there are shown examples of different members. Typically, a first member 22 associated with the first component 12 will engage a second opposing structural member 24 associated with the second component 16. Such engagement can be about the periphery of a component, on an interior portion (not shown) or both. Any suitable coating structure may be employed. For instance, a friction fit, an interference fit or some other interlock fit may be used. Examples of suitable joints include butt joints, lap joints, tongue in groove joints or the like. In one embodiment, shown in FIG. 3a, a snap fit connection 26 results from a tang 28 on the first member 22, engaging an opposing wall 30 formed on the second member 24. In another embodiment, in FIG. 3b, one of the components has a flange 32 having an inner wall surface 34 for increasing the surface area available for bonding and for engaging the other component. FIG. 3c is a magnified view of the joints shown in FIG. 2, and illustrates a detent 36 for achieving a snap fit and a rib 38 that penetrates a groove 40 about at least a portion of the mating surface for increasing surface area for contacting adhesive, and effectively forming a tongue-in-groove joint, snap fit or both. As will be appreciated, optionally, a tang or other like structure may be formed for assisting in achieving a snap fit or for providing an audible locator for facilitating assembly. Combinations of the above types of joints are also contemplated as possible within a single assembly. Further examples are illustrated in commonly owned, co-pending U.S. application Ser. No. 09/825, 721 (filed contemporaneously herewith; entitled "Adhesively Bonded Radiator Assembly"). Further, other suitable structures or surface treatments may be employed for providing an increase in the amount of surface area of the mating surfaces of the joint, or the overlap between the respect mating surfaces of the components.

The adhesive preferably is provided over at least a portion of the surfaces to be joined, and preferably sufficiently about the periphery so that there are no appreciable gaps that result between the first and second components. In one embodiment, a bead of adhesive is placed (e.g., by pumping) on the respective mating surface of at least one of the components and the opposing mating surface is brought into contact with it. The assembly is then cured. In another embodiment, the adhesive is precoated (e.g., by spraying, dipping, brushing, swabbing, or the like) on one or both of the mating surfaces of the respective components and then the components are joined and cured. Any other suitable joining technique may likewise be employed. Preferably the amount of adhesive employed is sufficient to achieve the desired performance characteristics of the assembly. Such amount will vary from application to application.

In one embodiment the invention is an engine intake manifold having disposed on the mating surfaces of its respective components a continuous bead or film of adhesive. As used herein continuous bead or film of adhesive means a bead or film of adhesive that is disposed around the periphery of the mating surface and the end of the adhesive bead or film connects with the beginning of the adhesive bead or film. The continuous bead or film of adhesive upon cure is capable all of forming an air and liquid tight seal between the components. This function allows the adhesive bead or film to replace gaskets as the sealing means. The adhesive may be applied to the intake manifold components in the immediate vicinity of the location where the components are to be contacted with each other or it may be applied in a location remote from where or when the components are to be contacted. Remote as used herein refers can refer to one or both of time and location. In the embodiment where the adhesive is applied to one or more of the components remote from the place wherein the components are joined together a cure-on-demand adhesive is used.

In a preferred embodiment of the present invention, either or both of the first or second components is fabricated from a plastic material, i.e., a thermoset material, a thermoplastic material, or a mixture thereof. Among preferred high-performance thermoplastic materials are polybutylene terephthalate, polyetherimides, polyphenylene ether/polyamide resins, polyether sulfone resins, polyether ether ketone resins, liquid crystal polymers, polyarylsulfone resins, polyamideimide resins, polyphthalimide resins, nylon 6, 6, polyamide resins, syndiotactic polystyrene, and blends thereof. In a particular preferred embodiment, the material is a thermoplastic selected from polyamides, polystyrenes, polyolefins, polycarbonates, or mixtures thereof. More preferably, the material is selected from polyamides (e.g., nylon 6,6), polystyrenes or mixtures thereof. In one preferred embodiment, the material is a blend of polyamides and syndiotactic polystyrenes, and more preferably a blend of nylon 6,6 and syndiotactic polystyrene. Among useful thermoset materials are epoxy resins.

The plastics used for preparing the components typically will also include other ingredients, such as reinforcements, property modifiers (e.g., impact modifiers, flame retardants, UV protectants or the like) or other suitable fillers (e.g., chopped glass, mineral, talc, calcium carbonate, or the like). For instance, in one embodiment, the plastic is glass filled in an amount of about 10 to about 50 volume percent and more preferably about 35 volume percent. Preferably, the material selected exhibits a tensile strength of at least about 175 MPa and more preferably at least about 225 MPa, and an elongation of about 1 to about 10%, and more preferably about 3 to about 5%. The material is also thermal resistant and will withstand without degradation temperatures of at least about 135° C. (about 275° F.) and more preferably 177° C. (350° F.) for at least about 144 hours and more preferably 168 hours.

Of course, one or more of the components might be a metal (e.g., cast iron, steel, magnesium, aluminum, titanium or the like), a composite, a ceramic (e.g., a carbide, a nitride, a boronitride, or the like), or some other material. The components are preferably injection molded using conventional techniques and processing conditions. Alternatively, they may be prepared in another suitable manner, such as by compression molding, thermoforming, blow molding or the like.

Either or both of the component materials or the adhesive may be suitably treated (uniformly or locally) as desired to improve corrosion resistance, oxidation resistance, thermal resistance, or another characteristic of the final product. For instance, they might be admixed, impregnated or coated with suitable additives for achieving a desired property. In some instances, bond strengths might be enhanced by further contacting the adhesive with a suitable primer.

The adhesive of the present invention is a structural adhesive and more preferably is a curable on demand material. Any adhesive that after cure can withstand the conditions of use of an engine (e.g., for an automotive vehicle) can be used. Preferably such adhesive does not decompose or delaminate at temperatures of up to about 138° C. (280° F.), more preferably up to about 143° C. (290° F.), even more preferably up to about 160° C. (320° F.) and most preferably up to about 191° C. (375° F.).

Furthermore, the adhesive is able to withstand exposure to hydrocarbon materials, calcium chloride, brake fluid, glycol coolants, windshield washer solvents and the like, at the above-mentioned temperatures and the pressures to which the internal combustion engine reaches internally. In an optional embodiment, the adhesive is able to bond to other engine components, which may be metallic, ceramic, composite, plastic, or the like. The adhesive used may be curable via a variety of known mechanisms including heat cure, infrared cure, ultraviolet cure, chemical cure, radio frequency cure, solvent loss, and moisture cure.

In another embodiment the adhesive is a cure-on-demand adhesive which requires a separate operation to cause the adhesive to begin to cure. In one embodiment this is achieved by using an encapsulated curing agent which is ruptured during assembly. In another embodiment this is achieved by removing a protective coating to expose the adhesive to ambient conditions. Cure can be initiated by exposing the adhesive to heat, infrared or ultraviolet light sources, or to shearing forces and the like.

While other adhesive families are contemplated as well (e.g., urethanes, acrylics, silanes, or the like), preferably the adhesive is a high temperature epoxy resin, a polyimide, a hi-bred polyimide/epoxy resin adhesive or an epoxy novolac/nitrile rubber adhesive. Preferred adhesives are the high temperature epoxy resin adhesives. High temperature epoxy resin adhesive means an adhesive wherein the primary component is an epoxy resin which when cured can withstand exposure to the temperatures mentioned above without decomposing or delaminating from the substrate.

In a particularly preferred embodiment, the adhesive is a mineral filled catalyzed adhesive that includes one or more regular or modified epoxy components, a suitable curing agent and a suitable thixotropic agent for maintaining a room temperature Brookfield viscosity (in uncured state) on the order of about 500 cps.

It should be recognized that the use of the term adhesive herein is not intended to foreclose primers or other bonding agents from the scope of the present invention.

The present invention offers considerable design flexibility. Though mating surfaces can be planar, they need not be. In a preferred embodiment, either or both of the mating surfaces is generally non planar (e.g., contoured, stepped, corrugated, or the like). The employment of molded plastic components also enables the formation of intricately shaped structures. In this regard, the intake manifold can have molded or otherwise fabricated in or on one of its surfaces one or more components such as brackets, connectors, cable guides, hose guides, harnesses, clips or the like. Further, conduits, ports or other like passages can be cored or machined into a molded component to enable integration of multiple components into the intake manifold assembly.

As will be appreciated by the skilled artisan, among the many advantages of the present invention are that assemblies can be made that are substantially free of a sealing gasket, mechanical fasteners or both. However, the scope of the present invention does not foreclose the use of gaskets or fasteners. Indeed, it is contemplated that a gasket might be made from (e.g., by die cutting a gasket) from the adhesive or incorporate as a component thereof (e.g. as an impregnant or coating), the adhesive of the present invention. The resulting structure seals much like a gasket would, but also exhibits the desirable mechanical characteristics of the structural adhesive.

Figure 3A:
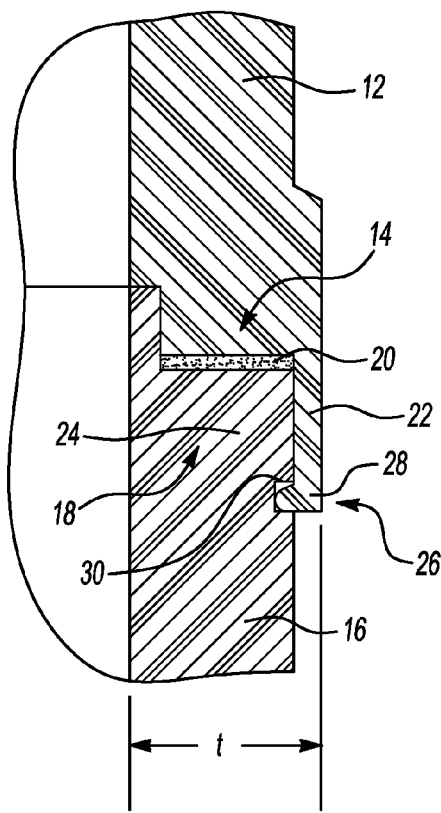
FIGS. 3a-3c are sectional views of examples of integrated mechanical attachments in the components of the assembly of the present invention.
Figure 3B:
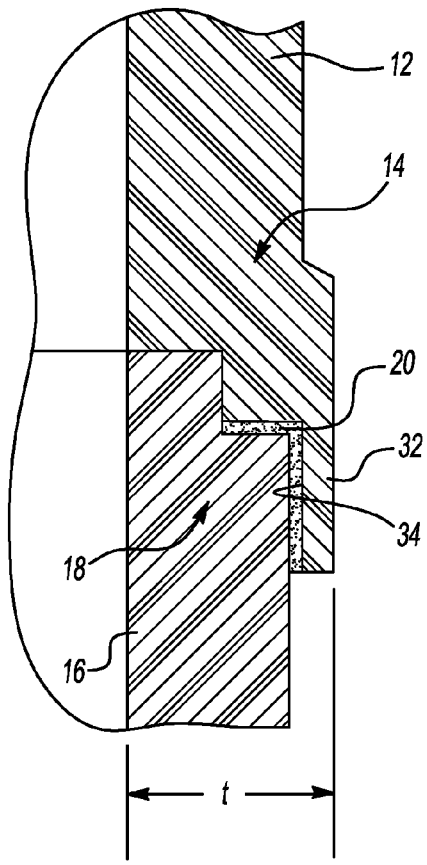
Figure 3C:
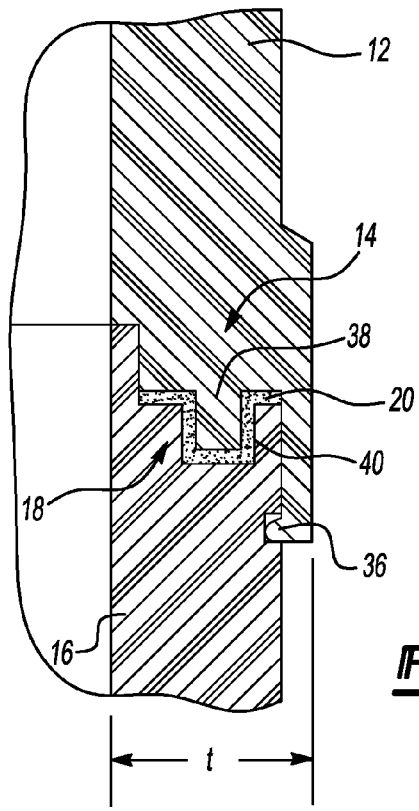

With specific reference to FIGS. 3a-3c, it can be seen that the joint has a transverse cross section thickness (t) at the joint. Though larger section thicknesses may be used and remain within the scope of the present invention, in certain highly preferred embodiments, the section thickness is less than about 7 mm, and still more preferably is less than about 5 mm (e.g., about 3 to about 4 mm). This further renders the present invention more advantageous than previous assemblies, which typically have employed larger section thicknesses.

Another advantage of the present invention relative to vibration welded assemblies is that substantially the entirety of the first and second mating surfaces in contact with the adhesive is capable of continuously bonding to the adhesive across the joint and thereby reinforcing the joint strength. In contrast, where filled or reinforced plastics are vibration welded, the filler or reinforcement (e.g., glass) will not weld at the weld interface. Thus, across the interface, there are discontinuities that inhibit achievement of high weld strengths.

Though the present invention has been described in the context of automotive vehicle engine intake manifolds, the use of the invention is not intended to be limited thereby. Any motorized object employing an intake manifold subject to operating conditions milder than or comparable to those experienced by an automotive vehicle engine may employ the present technology.

In preparation of the present assembly, the adhesive is applied to the by contacting the adhesive in a conventional fashion with one or more mating surface to form a continuous bead or film. The adhesive may be coated, extruded brushed or the like onto the surface. The adhesive can be applied immediately before joining components or it can be applied in remote location from the location where the components are bonded together, or the engine. The preferred cure-on-demand adhesive is exposed to conditions such that it will cure and thereby bond the components together and form a seal between them. Such conditions can be applied prior to or after bringing components together for joining. It is well within the average level of skill in the art to determine which operation may be used to cure the adhesive and when it should be performed. In one embodiment the operation may be an operation that is inherent in the assembly or operation of an automotive vehicle.

In another embodiment the intake manifold assembly may include an integrated acoustic management system designed to prevent the noise inherent in the operation of an internal combustion engine from escaping the engine compartment. In one embodiment the assembly may include an outer shell and an inner shell adapted such that the inner shall is located within the outer shell and there is a gap between the two. The gap may simply contain air which can attenuate certain sound waves thereby reducing the noise that can be heard outside the engine. Alternatively the gap can be filled with a sound deadening material such as elastomeric material or foam material. In another embodiment the valve cover may have bound to its inner surface a sound attenuating material such as the elastomer or foam.

In another embodiment the assembly of the invention can include a coating or film on the exterior or interior which functions to improve the barrier properties of the valve cover to hydrocarbons. Such a coating of film can reduce the fugitive hydrocarbon emission from an automotive vehicle. Any coating or film which prevents the transmission of hydrocarbons through the assembly may be used. A preferred coating is a carbon-silica based plasma deposited coating as described in U.S. Pat. Nos. 5,298,587; 5,320,875; 5,433,786 and 5,494,712 incorporated herein by reference.

The assembly of the present invention is capable of withstanding a temperature of about 163° C. (about 325° F.) for at least about 2500, and more preferably about 3000 hours and about 177° C. (about 350° F.) for at least about 75 and more preferably about 100 hours. The assembly exhibits substantially no detectable degradation in the presence of automotive vehicle fluids, such as brake fluid, windshield washer fluid, power steering fluid, engine coolant (standard and lifetime), engine oil (standard, synthetic and sour), gasoline, diesel fuel, ethanol, methanol, starter fluids or the like. The assembly also exhibits no detectable degradation due to exposure to environmentally encountered compounds such as calcium chloride, sodium chloride, exhaust gas (e.g. type) or the like. In a particularly preferred embodiment, the resulting tensile strength of the adhesive of the joint in the assembly is at least about 4000 psi (28 MPa), more preferably at least about 6500 psi (45 MPa), and still more preferably at least about 9000 psi (62 MPa). Further preferably the strength of the joint is greater than the strength of at least one, and preferably more than one, of the individual molded components.

The present intake manifold assembly can be employed in combination with other adhesively bonded engine components, such as described in commonly owned co-pending application Ser. No. 10/051,417 ("Adhesively Bonded Valve Cover Cylinder Head Assembly"), hereby incorporated by reference, and that disclosed in commonly owned co-pending application Ser. No. 09/825,721 ("Adhesively Bonded Radiator Assembly"), hereby incorporated by reference.

What is claimed is:

1. A method for making an automotive vehicle engine intake manifold assembly, comprising the steps of:
   a) providing a first component having an associated first mating surface for defining a joint;
   b) molding a second component having an associated second mating surface for opposing the first mating surface and defining the joint;
   c) applying an epoxy structural adhesive to at least one of the first component or the second component;
   d) joining the first component together with the second component with the epoxy structural adhesive therebetween for forming a joint section with a thickness less than about 7 mm;

e) snap-fitting the first component together with the second component;

f) curing the structural adhesive for bonding the first component with the second component; wherein at least one of the first or the second component includes a flange having an inner wall surface adapted for receiving the adhesive on at least one of the first component or the second component.

2. The method of claim 1, wherein the snap-fitting includes audibly locating the first component relative to the second component.

3. The method of claim 2, wherein the epoxy structural adhesive is a high temperature structural adhesive.

4. The method of claim 1, wherein the second component is a plastic that includes a material selected from polyamides, polystyrenes or mixtures thereof.

5. The method of claim 3, further including a step of exposing the adhesive to heat for initiating curing of the epoxy structural adhesive.

6. The method of claim 1, further including a step of contacting the structural adhesive with a primer.

7. The method of claim 1, wherein at least one of the first component or the second component includes a glass filled plastic.

8. A method for making an automotive vehicle engine intake manifold assembly, comprising the steps of:

a) providing a first component having an associated first mating surface for defining a tongue-in-groove joint having a section thickness less than about 5 mm;

b) injection molding a second component having an associated second mating surface for opposing the first mating surface and defining the tongue-in-groove joint;

c) applying a high temperature epoxy structural adhesive to at least one of the first component or the second component;

d) applying a primer to at least one of the first component or the second component;

e) joining the first component together with the second component with the high temperature epoxy structural adhesive therebetween;

f) snap-fitting the first component together with the second component;

g) exposing the adhesive to heat for initiating curing of the structural adhesive; and h) curing the structural adhesive for bonding the first component with the second component; wherein at least one of the first or the second component includes a flange having an inner wall surface adapted for receiving the adhesive on at least one of the first component or the second component.

9. The method of claim 8, wherein each of the first component and the second component are plastic.

10. The method of claim 9, further including a step of forming a flange having an inner wall surface adapted for receiving the adhesive on at least one of the first component or the second component.

11. The method of claim 10, wherein the second component is a plastic that includes a material selected from polyamides, polystyrenes or mixtures thereof.

* * * * *